No. 848,663. PATENTED APR. 2, 1907.
VAN BUREN LAMB.
BRAKE SHOE MOUNTING.
APPLICATION FILED MAY 19, 1906.

2 SHEETS—SHEET 1.

No. 848,663.
PATENTED APR. 2, 1907.
VAN BUREN LAMB.
BRAKE SHOE MOUNTING.
APPLICATION FILED MAY 19, 1906.
2 SHEETS—SHEET 2.
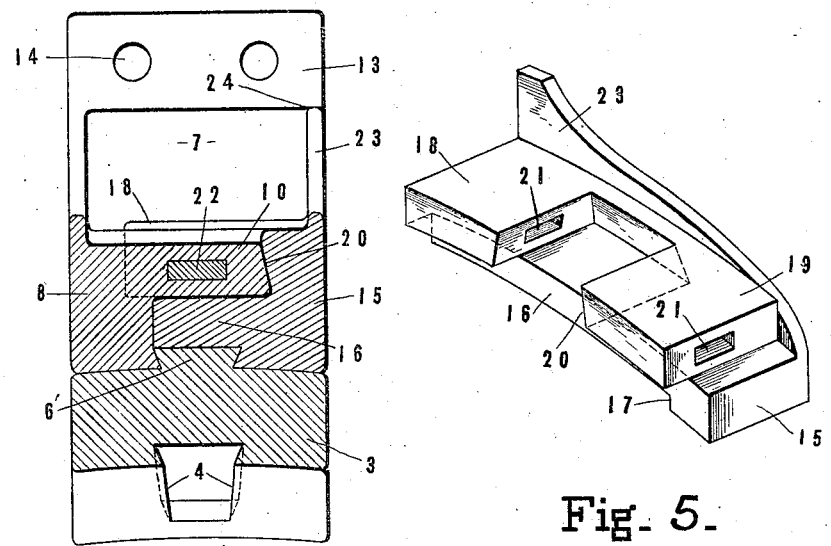
Fig. 4.
Fig. 5.
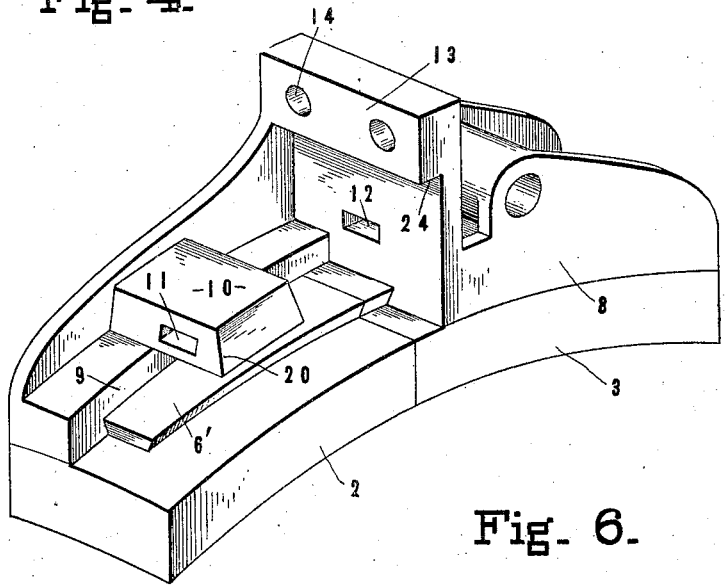
Fig. 6.
WITNESSES:
INVENTOR
Van Buren Lamb
BY
Warfield & Duell
ATTORNEYS.

UNITED STATES PATENT OFFICE.

VAN BUREN LAMB, OF NEW HAVEN, CONNECTICUT, ASSIGNOR TO KEYSTONE BRAKE SHOE COMPANY, OF NEW YORK, N. Y., A CORPORATION OF NEW YORK.

BRAKE-SHOE MOUNTING.

No. 848,663.　　　　Specification of Letters Patent.　　　　Patented April 2, 1907.

Application filed May 19, 1906. Serial No. 317,708.

*To all whom it may concern:*

Be it known that I, VAN BUREN LAMB, residing at New Haven, in the county of New Haven and State of Connecticut, have invented certain new and useful Improvements in Brake-Shoe Mountings, of which the following is a full, clear, and exact description, such as will enable others skilled in the art to which it appertains to make and use the same.

This invention relates to brake construction.

Among the objects thereof are the provision of a construction of and a mounting for brake-shoes of simple and durable form and highly-efficient action.

Another object is to provide means of the above type in which the metal is economically consumed and accidental dropping of the parts prevented.

Other objects will be in part obvious and in part pointed out hereinafter.

The invention accordingly consists in the features of construction, combinations of elements, and arrangement of parts, which will be exemplified in the embodiment thereof hereinafter described and the scope of the application of which will be indicated in the following claims.

Figure 3:
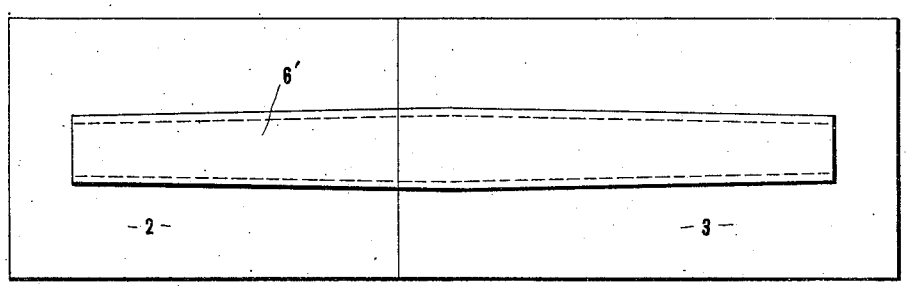
Figure 2:
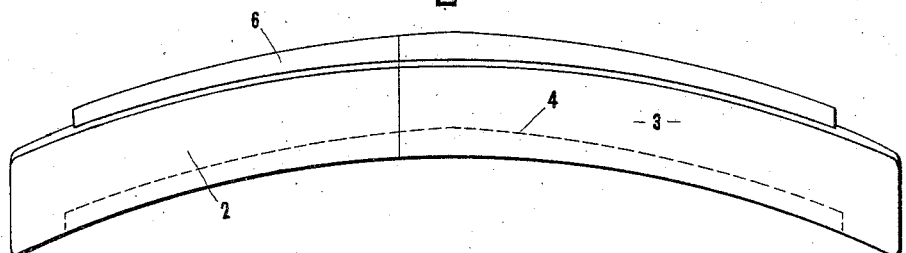
Figure 1:
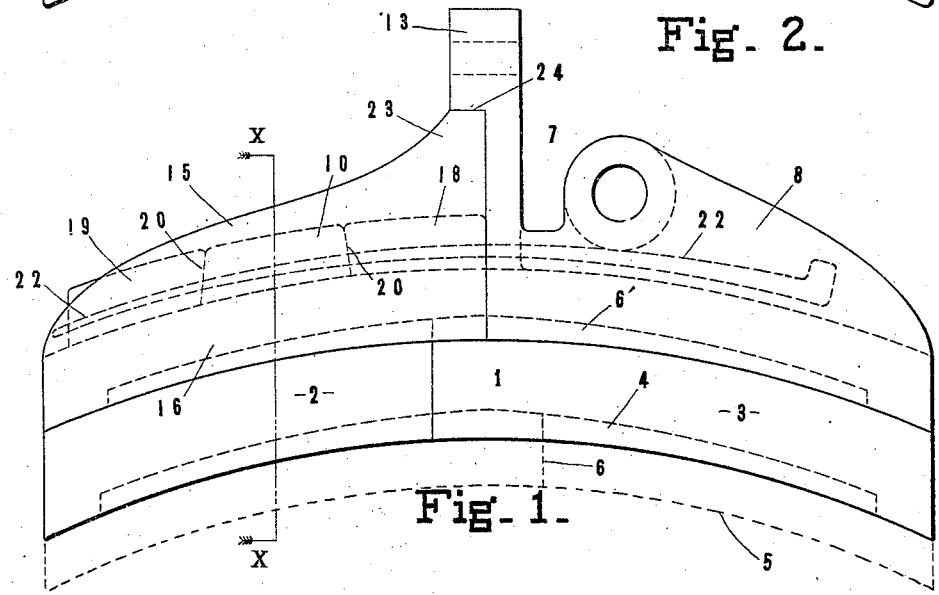

In the accompanying drawings, wherein is shown one of the various possible embodiments of my invention, Figure 1 is a side elevation thereof in assembled condition. Fig. 2 is a similar view of a detached shoe. Fig. 3 is a rear view of the same. Fig. 4 is a sectional elevation showing the relation of the parts one to another, the same being taken substantially on the line $xx$ of Fig. 1. Fig. 5 is a perspective view of a portion of a brake-head. Fig. 6 is a similar view of a shoe and a portion of a head in assembled relation.

Similar reference characters refer to similar parts throughout the several views of the drawings.

This invention will be the more readily grasped if the following facts are borne in mind: It is a feature of prime importance in constructions of the nature of those with which this invention deals that the parts be not only strong and durable in themselves, but be firmly locked in position. If the parts become accidentally detached, not only is the braking power of the car correspondingly decreased, which may become a factor of great importance in emergencies, but the falling parts are likely to clog switches and even in some instances cause derailment. I have found that for this secure interlocking bolts, keys, and even lugs are not in themselves thoroughly dependable, and in order to attain the best results I cause an interfitting of the shoes themselves. In the peculiar shaping and disposition of the parts whereby this interfitting is efficiently brought about lie certain dominant features of the present invention. It may also be noted at this point that the consumption of metal in modern railroad-brakes is considerable, due not only to the wearing away of the parts by which the braking action is brought about, but the scraping of partially-worn members, which are rendered useless in former inefficient constructions. The material lessening of this waste of metal forms one of the aims of this invention. The above and other advantageous features are attained in constructions of the nature of that hereinafter described.

Referring now to Fig. 1 of the accompanying drawings, there is shown a brake-shoe 1, comprising the parts 2 and 3, divided transversely of the shoe, preferably at a point off the center thereof. The face of this shoe is provided with a recess or mortise, which is of a general dovetail form and the walls 4 of which converge in a longitudinal direction toward each end of the shoe. The depth of this recess decreases, moreover, toward the ends of the shoe. Within this mortise is secured a shoe 5, (shown in dotted lines,) preferably of a construction substantially identical with that of shoe 1 and provided with a tenon fitting the above-described recess. Shoe 5 is preferably divided, as shown at 6, at a point staggered or offset with reference to the transverse dividing-line of shoe 1, so as to strengthen the construction of the parts in assembled condition and add to the general efficiency of the brake. Upon the rear surface of the parts 2 and 3 of the shoe 1 are formed dovetail tenons, and as these tenons form, with the parts in assembled condition, a single projection substantially identical with that above described with reference to shoe 5 they will be herein so considered and are referred to by the reference-numeral 6'.

The brake-head 7 comprises a part 8, preferably cast integral, which fits one end of the tenon 6', as shown in Fig. 6 of the drawings, and extends along one side of the other end of the tenon fitting beneath the undercut lateral walls thereof. The last-described portion of the head is provided with a shoulder 9 and a projection 10, which extends over and is spaced from the rear surface of the tenon. This projection is provided with a keyway 11 substantially registering with a keyway 12, formed within the flange 13, by which the head is mounted upon the brake-beam as through bolt-holes 14. The complementary portion of the head 15 (shown in Fig. 5 of the drawings) comprises a base 16, adapted to extend over the rear face of the tenon 6', as shown in Fig. 4 of the drawings, and fit beneath the projecting portion 10. This base is cut away, as shown at 17, so as to provide a recess which is substantially of dovetail formation and with the parts in assembled condition fits about the outer surface of the tenon. Projections 18 and 19, spaced one from another, as shown in Fig. 5 of the drawings, are also provided upon the portion 15 and intermesh with the projection 10, the parts being beveled, as shown at 20 in the drawings, in order to resist any tendency of the shoe to draw this portion away from the main portion of the head. Projections 18 and 19 are provided with keyways 21, registering with the ways 11 and 12 above described and adapted with the parts assembled to permit the passage of a key 22 therethrough, thus securely locking the parts together. This locking action, moreover, is enhanced by the disposition of a web 23, formed upon the part 15, which takes under a projecting shoulder 24 upon the flange 13.

The method of use of the above-described embodiment of my invention is substantially as follows: Assuming that the shoe is worn to a point near the head, the parts are detached by withdrawing the key 22, whereupon the part 15 of the head may be removed in a lateral direction, and thus release the part 2 of the shoe. The part 3 of the shoe is then drawn from the main portion of the head. The new shoe is then mounted about the worn portion which has just been removed by sliding the parts in a longitudinal direction over each end of the tenon formed thereon, thus positioning the worn shoe in the position shown in the dotted lines of Fig. 1 of the drawings, and the head is slid over one end of the tenon upon the rear surface of the new shoe. The part 15 is then forced in a lateral direction toward the opposite portion of the head and the projection 10 with its outwardly-tapered walls fits between the projections 18 and 19, as above described, and is secured in place, as by the key.

It will thus be seen that I have provided a construction in which the several objects of my invention are fulfilled. The parts are so disposed as to interfit one with another and are held in place by a single key. It will be seen, moreover, that no direct stress is brought to bear upon this key, as it is called upon to resist merely the tendency of the part 15 to spring out in a lateral direction, and no material force is brought to bear to tend to cause such springing movement. The parts are readily assembled without the use of special tools and are of such simple construction as to permit them to be readily interchangeable. It will also be seen that the entire shoe may be worn away, thus consuming all of the metal and doing away with the chance of dropping parts upon the road-bed with the results above indicated. The entire construction is of the simplest and cheapest type, moreover, and is well adapted to withstand the somewhat severe conditions of practical use.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention which as a matter of language might be said to fall therebetween.

Having described my invention, what I claim as new, and desire to secure by Letters Patent, is—

1. In construction of the class described, in combination, a brake-shoe divided transversely into two parts, a divided brake-head engaging the shoe and holding the parts thereof in assembled relation, and means adapted to hold together the parts of said head.

2. In construction of the class described, in combination, a brake-shoe divided transversely into two parts and provided upon its rear surface with a laterally-undercut projection, a divided brake-head adapted to fit about said projection and hold the parts of said shoe in assembled condition, and means adapted to hold together the parts of said head.

3. In construction of the class described, in combination, a brake-shoe divided transversely into two parts and provided upon its rear surface with a laterally-undercut projection tapering toward each end of the shoe, a divided brake-head adapted to fit about said projection and hold the parts of said shoe in assembled condition, and means adapted to hold together the parts of said shoe.

4. In construction of the class described, in combination, a brake-shoe divided transversely into two parts, a divided brake-head engaging the shoe and holding the parts thereof in assembled relation, and means adapted to hold together the parts of said head, the line of division of said brake-head being offset with respect to the line of division of said brake-shoe.

5. In construction of the class described, in combination, a brake-shoe divided transversely into two parts and provided upon its rear surface with a laterally-undercut projection, a divided brake-head adapted to fit about said projection and hold the parts of said shoe in assembled condition, and means adapted to hold together the parts of said head, the line of division of said brake-head being offset with respect to the line of division of said brake-shoe.

6. In construction of the class described, in combination, a brake-shoe divided transversely into two parts, a second brake-shoe adapted to engage and hold together the parts of said first brake-shoe, said second shoe being divided transversely into two parts, a divided head engaging said second shoe and holding the parts thereof in assembled relation, and means adapted to hold together the parts of the head.

7. In construction of the class described, in combination, a brake-shoe divided transversely into two parts, a second brake-shoe adapted to engage and hold together the parts of said first brake-shoe, said second shoe being divided transversely into two parts, a divided head engaging said second shoe and holding the parts thereof in assembled relation, and means adapted to hold together the parts of the head, the lines of division of said two shoes being offset with respect one to another.

8. In construction of the class described, in combination, a brake-shoe divided transversely into two parts, a second brake-shoe engaging and interfitting with the rear of said first shoe and divided transversely into two parts on a line offset with respect to the line of division of said first shoe, and means adapted to hold together the portions of said second shoe.

9. In construction of the class described, in combination, a brake-shoe divided transversely into two parts, a second brake-shoe engaging and interfitting with the rear of said first shoe and divided transversely into two parts on a line offset with respect to the line of division of said first shoe, said second shoe being formed with a projecting tenon having undercut lateral walls, a divided head, the parts of which fit about said tenon, and means adapted to hold together the parts of said head.

10. In construction of the class described, in combination, a brake-shoe divided transversely into two parts, a second brake-shoe engaging and interfitting with the rear of said first shoe and divided transversely into two parts on a line offset with respect to the line of division of said first shoe, said second shoe being formed with a projecting tenon having undercut lateral walls, a divided head, the parts of which fit about said tenon, and means adapted to hold together the parts of said head, said first and second shoes being interchangeable one with another.

11. In construction of the class described, in combination, a brake-shoe provided with a projecting tenon, the lateral surfaces of which are undercut, a divided head one end of which fits about one portion of said tenon and the other end of which comprises laterally-separable parts, and means adapted to hold said parts together.

12. In construction of the class described, in combination, a brake-shoe provided with a projecting tenon, the lateral surfaces of which are undercut, a divided head one end of which fits about one portion of said tenon and the other end of which comprises laterally-separable parts, said parts of said head being provided with laterally-extending projections intermeshing one with another, and means adapted to hold said parts together.

13. In construction of the class described, in combination, a brake-shoe provided with a projecting tenon the lateral surfaces of which are undercut, a divided head one end of which fits about one portion of said tenon and the other end of which comprises laterally-separable parts, said parts being provided with laterally-extending projections adapted to intermesh one with another and having keyways formed therein registering one with another with the parts in assembled relation, and a key passing through said keyways and holding said parts together.

14. In construction of the class described, in combination, a pair of substantially interchangeable shoe members each of which is provided upon its rear surface with a projection having undercut lateral walls and upon its front surface with a recess adapted to fit a similar projection whereby each shoe member is adapted to be mounted upon the other, each shoe member being transversely divided and the lines of division being offset with respect one to another with the parts in assembled condition.

15. In construction of the class described, in combination, a brake-shoe provided with a projecting tenon having its lateral surfaces undercut, a brake-head provided with laterally-separable parts adapted to fit about said tenon, said parts having projecting portions intermeshing one with another with the parts in assembled condition and provided with keyways, and a key passing through said keyways and locking said parts in assembled relation.

16. In construction of the class described, in combination, a brake-shoe provided with a projecting tenon having its lateral surfaces undercut, a brake-head comprising laterally-separable parts adapted to fit about said tenon, one of said parts being provided with a projection the walls of which converge in a direction away from the shoe and the other of said parts being provided with a pair of projections adapted to fit about said first-mentioned projection, and a key passing through keyways formed in said projections and locking said parts in assembled relation.

17. In construction of the class described, in combination, a brake-shoe provided with a projecting tenon having its lateral surfaces undercut, a divided head one end of which fits about one portion of said tenon and the other end of which comprises laterally-separable parts, intermeshing projections formed upon said parts and provided with converging walls, a shoulder formed upon said head under which one separable part is adapted to rest, and a key passing through said head and holding the parts in assembled relation.

18. In construction of the class described, in combination, a brake-shoe provided with a projecting tenon having its lateral surfaces undercut, a divided head one end of which fits about one portion of said tenon and the other end of which comprises laterally-separable parts, intermeshing projections formed respectively upon said parts and provided with converging walls, a shoulder upon said head upon which the projection from one separable part rests, a shoulder upon said separable part upon which the projection from said head rests, and a key passing through said head and holding the parts in assembled condition.

19. In construction of the class described, in combination, a brake-shoe provided with a projecting tenon having its lateral surfaces undercut and tapering toward the ends of the shoe, a divided head one end of which fits about one portion of said tenon and the other end of which comprises laterally-separable parts, intermeshing projections formed upon said parts and provided with converging walls, a shoulder formed upon said head under which one separable part is adapted to rest, and a key passing through said head and holding the parts in assembled relation.

20. In construction of the class described, in combination, a shoe divided transversely into two parts, a divided brake-head fitting about one end of said shoe and having at its other end a laterally-separable portion adapted to fit about the other end of the shoe, and means adapted to hold the parts of said head together.

21. In construction of the class described, in combination, a shoe divided transversely into two parts and provided upon its rear surface with a tenon having its lateral walls undercut, a brake-head having laterally-separable portions provided with laterally-extending projections adapted to intermesh upon said portions being fitted about said tenon, and means adapted to hold the portions of said head in assembled relation.

22. In construction of the class described, in combination, a shoe divided transversely into two parts and provided upon its rear surface with a tenon having its lateral walls undercut, a head having laterally-separable parts adapted to fit about said tenon, each of said parts being provided with a laterally-extending projection adapted to rest against the other with said parts in assembled condition, and a key adapted to pass through a keyway formed in said portions.

23. In construction of the class described, in combination, a brake-shoe divided transversely into two parts and provided upon its rear surface with a tenon having its lateral walls undercut, a second brake-shoe divided into two parts and fitted about said tenon and provided with a similar tenon upon its rear surface, a divided head fitted about one end of the tenon upon said second shoe and provided with a laterally-separable portion adapted to fit about the other end thereof, and means adapted to hold said portions of said head in assembled condition.

24. In construction of the class described, in combination, a brake-shoe divided transversely into two parts and provided upon its rear surface with a tenon having its lateral walls undercut, a second brake-shoe divided into two parts and fitted about said tenon and provided with a similar tenon upon its rear surface, a divided head fitted about one end of the tenon upon said second shoe and provided with a laterally-separable portion adapted to fit about the other end thereof, a projection formed upon the main portion of said head, a projection formed upon the separable portion of said head and adapted to rest against said first projection, and a key adapted to pass through said projections and lock the same in assembled relation.

25. In construction of the class described, in combination, a brake-shoe divided transversely into two parts and provided upon its rear surface with a tenon having its lateral walls undercut, a second brake-shoe divided into two parts and fitted about said tenon and provided with a similar tenon upon its rear surface, a divided head fitted about one end of the tenon upon said second shoe and provided with a laterally-separable portion adapted to fit about the other end thereof, a projection formed upon the main portion of said head, a projection formed upon said separable portion of said head and adapted to rest against said first projection, and a key adapted to pass through said projections and lock the same in assembled relation, the lines of division of said two shoes being offset with respect one to another.

In testimony whereof I affix my signature in the presence of two witnesses.

VAN BUREN LAMB.

Witnesses:
 R. S. BLAIR,
 ARTHUR G. PREVIN.